Figure 1:
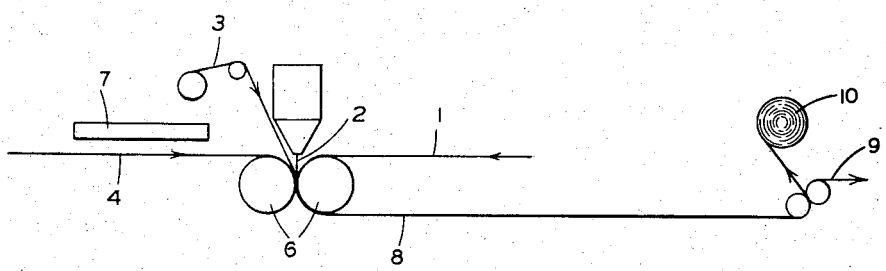

Dec. 26, 1967    R. P. DESCH    3,360,422
REINFORCED CELLULAR FLOOR COVERING
Filed Oct. 19, 1965

INVENTOR
ROBERT P. DESCH

BY *Theodore L. Thomas*
ATTORNEY

3,360,422
REINFORCED CELLULAR FLOOR COVERING
Robert P. Desch, Lancaster, Pa., assignor to Armstrong Cork Company, Lancaster, Pa., a corporation of Pennsylvania
Filed Oct. 19, 1965, Ser. No. 497,737
2 Claims. (Cl. 161—89)

This invention relates to a foamed floor covering consisting essentially of a poly(vinyl chloride) wearing surface, a cellular poly(vinyl chloride) backing, and an open-weave reinforcing fabric positioned between the two and encased in an adhesive film consisting of plasticized vinyl chloride polymer or copolymer.

U.S. Patent 3,002,868 discloses a foamed floor covering having a wearing surface, a foamed backing, and a tightly woven glass fabric positioned between the wearing surface and the backing. This floor covering possesses resistance to stretching during handling. However, the tightly woven glass fabric and the ordinary adhesive used to cement the layer together render the floor covering liable to delamination. Accordingly, there is need for an improvement to present a floor covering which resists stretching and deformation in handling and installation and which also strongly resists a tendency toward delamination in use.

This need is fulfilled by utilizing an open-weave fabric positioned between a poly(vinyl chloride) wearing surface and a cellular poly(vinyl chloride) backing. The adhesive film consists of a pigmented or unpigmented plasticized film of poly(vinyl chloride) or vinyl chloride-vinyl acetate copolymer having a thickness in the range of 110%–200% of the thickness of the open-weave fabric and containing plasticizer for the vinyl chloride polymer in an amount of 20%–65% by weight of the vinyl chloride polymer.

The poly(vinyl chloride) wearing surface may be prepared by any known methods, for example, according to the disclosures of U.S. Patents 3,000,754, 3,056,224, and 3,115,386. The wearing surface for use in this invention will be unsupported and will have a thickness in the range of 0.01–0.1 inch.

The cellular poly(vinyl chloride) backing may be prepared by any of the known method of preparing poly(vinyl chloride) foams. The foamed sheet may be prepared by incorporating a blowing agent in a film of poly(vinyl chloride) followed by heating under suitable conditions to gel the usual plasticizer-poly(vinyl chloride) composition and to decompose the blowing agent to form the foamed sheet. Alternatively, the foamed backing may be sliced or cut from frothed or foamed sheets or strips prepared in any convenient manner. The thickness of the foam backing will be that desired to form the floor covering, depending on the use and location of the floor, but will generally be in the range 0.02–0.3 inch.

Both the poly(vinyl chloride) wearing surface and the cellular poly(vinyl chloride) backing may contain the typical fillers, pigments, stabilizing systems, and lubricants well known in the art of making polyvinyl chloride) compositions. The plasticizers also will be the plasticizers suitable for imparting to the poly(vinyl chloride) the requisite flexibility and workability for service as floor coverings.

The open-weave fabric may be any suitable woven fabric having five to twenty openings per inch, with fifteen openings to the inch being a good workable number. The smaller the openings, the greater the tensile strength of the resulting final laminated product, but the less the adhesion between the wearing surface and the backing. The larger the openings, the less tensile strength imparted to the final laminated product, but the greater the adhesion. A glass fiber open-weave scrim is preferred.

The adhesive film will be a plasticized layer of poly(vinyl chloride) or vinyl chloride-vinyl acetate copolymer containing 3%–14% by weight vinyl acetate. The film must be thicker than the thickness of the open-weave scrim, the film having a thickness in the range 110%–200% the thickness of the scrim fabric. Plasticizer content of the poly(vinyl chloride) adhesive film will be in the range 20%–65% the weight of the poly(vinyl chloride), and 20%–40% by weight of the vinyl chloride-vinyl acetate copolymer. Stabilizing systems, lubricants, and pigments may be used, but little or no filler. The preferred method of preparing the adhesive film is simply to mix the ingredients in a mixer and to extrude the adhesive film as such from a suitable flat film extruder. The film is then passed directly to a laminator. The preferred film is poly(vinyl chloride).

An embodiment of the invention is illustrated in the accompanying drawing in which—

Figure 2:
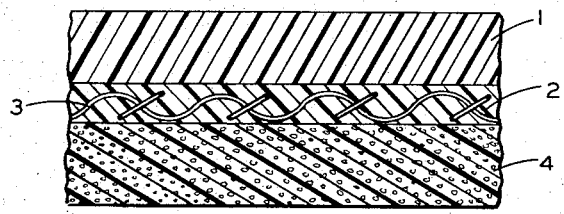

FIG. 1 is a simplified diagrammatic representation of a method of forming the laminated product, and FIG. 2 is an enlarged section, not to scale, of the final product.

Referring to FIG. 1, the wearing surface 1, the vinyl chloride polymer adhesive film 2, the open-weave fabric 3, and the foam poly(vinyl chloride) backing 4 optionally on a release carrier are all fed to the laminating rolls 6. Suitable heat for the lamination step may be supplied by the heater 7 which may heat the foam backing 4, but not the unsupported wearing surface 1, and will normally supply all the heat that is needed for the laminating process. The finished laminated product 8 leaves the laminating rolls 6 and after cooling and separation from any release carrier 9, may be rolled as at 10 for shipment.

Referring to FIG. 2, the poly(vinyl chloride) wearing surface 1 and the cellular poly(vinyl chloride) backing 4 are bonded by the vinyl chloride polymer adhesive film 2 which flows through the open pores of the open-weave scrim 3. Due to the different characteristics of the wearing surface 1 and the cellular backing 4, the adhesive film 2 normally establishes a stronger bond with the backing 4 than with the wearing surface 1. It is desirable therefore that the scrim 3 rest against the backing 4 rather than against the wearing surface 1 in order that a greater area of contact be established between the wearing surface 1 and the adhesive film 2 than between the adhesive film 2 and the backing 4.

I claim:

1. A cushion type of floor covering which maintains its dimensional stability and resists delamination comprising:

a flexible wearing surface layer in the form of a sheet of plasticized poly(vinyl chloride) resin;

a flexible cushion backing layer in the form of a sheet of plasticized cellular poly(vinyl chloride) resin positioned beneath and substantially co-extensive in area with the wearing layer;

an improved adhesive layer consisting essentially of a plasticized film of a vinyl chloride polymer selected from the group consisting of poly(vinyl chloride) and vinyl chloride-vinyl acetate copolymer and containing a plasticizer for the vinyl chloride polymer in an amount of 20% to 65% by weight of the vinyl chloride polymer disposed between the flexible wearing surface layer and the flexible cushion backing layer and adhered directly to substantially the entire confronting faces thereof so as to strongly bond the wearing surface and cushion backing layers together in a manner to resist delamination; and a supporting open mesh glass fiber fabric scrim layer having a number of enlarged openings per unit area and being substantially co-extensive in area with said other layers and of lesser thickness than and embedded in said adhesive bonding layer, said adhesive layer having a thickness in the range of 110% to 200% of the thickness of said scrim, the vinyl chloride polymer material extending freely through the openings in the scrim and extending integrally across the space between the confronting faces and into contact therewith and completely surrounding and embedding said scrim whereby said glass fabric scrim is confined in fixed position relative to said other layers and serves to maintain the dimensional stability of the floor covering.

2. The invention in accordance with claim 1 wherein a greater area of contact is established between the wearing surface area and the adhesive layer than between the adhesive layer and the backing layer.

References Cited

UNITED STATES PATENTS 2,956,917 10/1961 Fasano _____ 161—93
2,979,835 4/1961 Scholl.
3,002,868 10/1961 Boivin _____ 161—93

ROBERT F. BURNETT, *Primary Examiner.*

JACOB H. STEINBERG, ALEXANDER WYMAN,
*Examiners.*

M. A. LITMAN, *Assistant Examiner.*